United States Patent Office 3,674,521
Patented July 4, 1972

3,674,521
CLAY
Frank Raymond Noble, Cornwall, England, assignor to English Clays Lovering Pochin & Company Limited, Cornwall, England
No Drawing. Filed May 5, 1970, Ser. No. 34,881
Claims priority, application Great Britain, May 12, 1969, 24,165/69
Int. Cl. C04b *33/12*
U.S. Cl. 106—72                                  15 Claims

ABSTRACT OF THE DISCLOSURE

The invention concerns a method of treating a raw kaolinitic clay in order to improve the rheological properties thereof. The raw kaolinitic clay is saturated or substantially saturated with cations selected from the group consisting of lithium ions, magnesium ions and sodium ions, and is then heated to a temperature in the range of from 200° C. to 450° C. The clay is washed with an aqueous washing medium after it has been saturated or substantially saturated with said cations and either before or after said heating.

BACKGROUND OF THE INVENTION

This invention relates to the treatment of raw kaolinitic clays.

It is known to improve the rheological properties of kaolinitic clays, e.g. china clay, by mechanical working of the clay; for example, there have been disclosed processes for treating a raw kaolinitic clay in which both the viscosity of an aqueous suspension of the clay and the particle size of the clay are reduced by treating a paste or dough of the clay with a kneading or pug-milling action; but with these processes a large power input is required and the solids content of the paste or dough of kaolinitic clay treated must be maintained within narrow limits.

It is an object of the present invention to provide a method of treating raw kaolinitic clays, in order to improve their rheological properties, which method obviates the disadvantages mentioned above.

SUMMARY OF THE INVENTION

According to the present invention there is provided a method of treating a raw kaolinitic clay in order to improve the rheological properties thereof, which method comprises the steps of saturating or substantially saturating the raw kaolinitic clay with lithium, magnesium or sodium ions, heating the thus treated clay to a temperature in the range of from 200° C. to 450° C., and washing the clay before or after said heating.

DESCRIPTION OF THE PREFERRED EMBODIMENTS

Preferably, the raw kaolinitic clay is saturated or substantially saturated with lithium or magnesium ions.

The saturation or substantial saturation of the kaolinitic clay with the selected cation can be effected either (a) by suspending the kaolinitic clay in an aqueous solution of an electrolyte containing the selected cation, preferably repeating this procedure at least once, or (b) by passing an aqueous suspension of the kaolinitic clay through an ion exchange material which has been previously saturated with the selected cation. When adopting method (a) above it is advantageous to treat the raw kaolinitic clay with at least 100 milliequivalents of the selected cation per 100 grams of dry, raw kaolinitic clay in order to ensure that the kaolinitic clay is saturated or substantially saturated with the lithium, sodium or magnesium ions. Generally, the quantity of the cation required will not exceed 2000, or at most 2500, milliequivalents of the cation per 100 grams of dry, raw kaolinitic clay. Although it is advantageous to treat the kaolinitic clay with at least 100 milliequivalents of the selected cation per 100 grams of clay only about 2 to 30 milliequivalents of cation per 100 grams of clay are actually adsorbed by the clay.

The optimum temperature to which the clay is heated, after being saturated or substantially saturated with lithium, magnesium or sodium ions, depends on the cation used; thus, if the cation used is lithium the clay should be heated to a temperature in the range of from 200° C. to 350° C., if the cation used is magnesium the clay should be heated to a temperature in the range of from 300° C. to 400° C., and if the cation used is sodium the clay should be heated to a temperature in the range of from 400° C. to 450° C.

In one embodiment of the invention, after being saturated or substantially saturated with the selected cation, the kaolinitic clay is washed with water to remove excess cations, and is then filtered and dried before being heated to a temperature in the range of from 200° C. to 450° C. It is not necessary to carry out a separate drying operation provided that the temperature of the furnace in which the heating to above 200° C. takes place is raised slowly, e.g. at a rate of less than 1° C. per minute, for the first two hours.

Heating kaolinitic clays to a temperature in the range 200° to 450° C. sometimes causes a drop in the brightness (or percentage reflectance to visible light) of the clay due to the charring of organic compounds associated with the clay. It has therefore been found to be advantageous to carry out the heating of the clay in the presence of a quantity of oxygen sufficient to oxidise organic compounds present in the clay. This can be achieved by admixing with the clay, before or during the period in which it is heated to a temperature in the range 200° C. to 450° C., a compound which decomposes with the evolution of oxygen at a temperature which is from 50° C. to 150° C. higher than the temperature to which the cation-saturated clay is to be heated. For example, if the cation-saturated clay is to be heated to 250° C. the compound which decomposes with the evolution of oxygen should be one which decomposes at a temperature in the range 300° C. to 400° C., for example sodium nitrate or magnesium nitrate. The temperature at which the compound decomposes is important as the oxygen must be evolved at a rate which is neither too fast nor too slow. Alternatively, the cation-saturated clay can be heated to a temperature in the range 200° C. to 450° C. in an atmosphere of oxygen or of oxygen-enriched air. When a compound which decomposes with the evolution of oxygen is admixed with the clay, the washing of the clay is carried out after the heating step since otherwise the oxygen-yielding compound will be washed out of the clay.

After the heating step has been carried out the clay is advantageously comminuted. This can be effected, for example, by milling in a hammer mill in order to break down any agglomerates of clay particles without affecting to any great extent the ultimate particle size of the clay. Alternatively, it may be desirable to reduce the particle size of the clay by treatment in a Z-blade mixer or in a pug mill or by grinding the clay with a particulate grinding medium, for example in accordance with the process disclosed in United States patent specification No. 3,075,710. It may also be desirable to classify the solid particles of clay, subsequent to the comminuting operation, by a gravitational or centrifugal separating process in order to separate from the coarse particles those particles having a size finer than, say, 2 microns equivalent spherical diameter (e.s.d.), which can be used for example in a paper coating composition. The comminution of the clay can be effected either before or after the washing step.

The invention is illustrated by the following examples.

Example 1

In this example there was employed a raw kaolinitic clay which had a particle size distribution such that 56% by weight consisted of particles smaller than 2 microns e.s.d. and 7% by weight consisted of particles larger than 10 microns e.s.d. and which contained inter alia as impurities quartz, felspar, mica and montmorillonite. 1000 gm. of this raw kaolinitic clay were stirred for 2 hours with 5 litres of a 2 N aqueous solution of lithium chloride. The lithium ion-saturated clay thus formed was then washed with water and filtered and the filter cake heated to 340° C. for 16 hours. The resulting filter cake was divided into two portions.

The first portion of filter cake was broken down in a laboratory hammer mill. The viscosity of the hammer milled clay in aqueous suspension was measured, the viscosity being expressed in terms of the solids content of a fully deflocculated aqueous suspension of the clay which had a viscosity at 22° C. of 5 poise as measured by a Brookfield viscometer at speed 100 using spindle 3.

The second portion of filter cake was subjected to a sand-grinding process by mixing the filter cake with water in the proportions 420 gm. of filter cake to 850 ml. of water and agitating the resulting slurry with 1200 gm. of Leighton Buzzard sand consisting of particles ranging in size from No. 16 mesh B.S. sieve to No. 30 mesh B.S. sieve for a period of 25 minutes during which time 166 HP-hr. of energy per long ton of dry clay ($4.39 \times 10^5$ joules/kg.) were dissipated in the slurry. The clay slurry was then separated from the sand, by washing on a sieve, and concentrated by filtration. The solids content of a fully deflocculated aqueous suspension of the clay which had a viscosity at 22° C. of 5 poise was determined as above.

The first and second portions of clay were then each subjected to gravitational sedimentation in aqueous suspension containing 10% by weight of solids and 0.3% by weight, based on the weight of dry clay, of tetrasodium pyrophosphate defloculant for 235 minutes per foot depth of suspension to obtain a fine product of which 80% by weight consisted of particles smaller than 2 microns e.s.d. The solids content of a fully deflocculated aqueous suspension of each portion of clay which had a viscosity of 5 poise at 22° C. was determined for both these fine products.

As a control experiment, 420 gm. of the original, raw kaolinitic clay was subjected to sand-grinding under identical conditions to those described above, and the solids content of the fully deflocculated suspension which had a viscosity of 5 poise at 22° C. was determined.

As a further control experiment, the original raw kaolinitic clay was subjected to gravitational sedimentation in aqueous suspension containing 10% by weight of solids and 0.3% by weight, based on the weight of dry clay, of tetrasodium pyrophosphate defloculant for 235 minutes per foot depth of suspension to obtain a fine product of which 80% by weight consisted of particles smaller than 2 microns e.s.d. The solids content of the fully deflocculated suspension which had a viscosity of 5 poise at 22° C. was determined.

The results obtained from the various experiments described above are shown in the following Table I.

TABLE I

| Material | Percent by weight of solids in a suspension having a viscosity of 5 poises at 22° C. |
|---|---|
| (A) Original raw kaolinitic clay | 59.0 |
| (B) Original raw kaolinitic clay, treated by the method of the invention and hammer milled | 61.6 |
| (C) Original raw, kaolinitic clay, treated by the method of the invention and sand-ground | 65.2 |
| (D) Fine product from treated and hammer milled clay | 65.3 |
| (E) Fine product from treated and sand-ground clay | 65.3 |
| (F) Original raw kaolinitic clay, sand-ground only | 57.9 |
| (G) Fine product from original raw kaolinitic clay | 58.5 |

The kaolinitic clay which had been treated with lithium chloride and hammer milled was found to have a particle size distribution such that 53% by weight consisted of particles smaller than 2 microns e.s.d. and 8% by weight of particles larger than 10 microns e.s.d. and the kaolinitic clay which had been treated and sand ground had a particle size distribution such that 72% by weight consisted of particles smaller than 2 microns e.s.d. and 0.9% by weight of particles larger than 10 microns e.s.d.

The recovery of the fine product from the original raw kaolinitic clay was 73% by weight; the recovery of the fine product from the kaolinitic clay which had been treated with lithium chloride and hammer milled was 72% by weight; and the recovery of the fine product from the kaolinitic clay which had been treated with lithium chloride and sand-ground 93% by weight.

Example 2

In this example there was employed a raw kaolinitic clay which initially had a particle size distribution such that 53% by weight consisted of particles smaller than 2 microns e.s.d. and 8% by weight consisted of particles larger than 10 microns e.s.d. and which contained inter alia as impurities quartz, felspar, mica and montmorillonite. 400 g. of this raw kaolinitic clay were stirred for 2 hours in 2 litres of a 2 N aqueous solution of lithium chloride. The kaolinitic clay saturated with lithium ions was then filtered and heated for 16 hours at a maximum temperature of 250° C.

The resulting hard cake of heated, lithium ion-saturated kaolinitic clay was then pulverized in a laboratory hammer mill and the pulverized clay thoroughly washed with water, to remove the lithium cations as completely as possible, by three times performing the steps of slurrying the clay with water and then separating the washed clay from the water by filtration. The viscosity of the ground clay in aqueous suspension was measured in terms of the solids content of a fully deflocculated aqueous suspension of the clay which had a viscosity of 5 poise at 22° C. as measured by a Brookfield viscometer at speed 100 using spindle 3. The particle size distribution of the pulverised clay was also determined and it was found that 51% by weight consisted of particles smaller than 2 microns e.s.d. and 7% by weight of particles larger than 10 microns e.s.d.

A further 400 g. sample of the same raw kaolinitic clay was saturated with lithium ions and heated in the same way as the first sample. The resulting hard cake was mixed with sufficient water to form a paste containing 30% by weight of water which was worked in a Z-blade mixer for a length of time such that 49 HP-hr. of energy per long ton of dry clay ($1.3 \times 10^5$ joules per kilogram) were dissipated in the paste. The paste was then thoroughly washed with water by the method described above for the first sample. The solids content of the fully flocculated aqueous suspension of the clay which had a viscosity of 5 poise at 22° C. was determined as above.

The results obtained from the above experiment are shown in Table II below.

TABLE II

Material:
Percent by weight of solids in a suspension having a viscosity of 5 poise
- (H) Original raw kaolinitic clay _____ 60.3
- (I) Original raw kaolinitic clay, treated by the method of the invention and hammer milled _____ 69.1
- (J) Original raw kaolinitic clay, treated by the method of the invention and worked in a Z-blade mixer _____ 72.5

If these results are compared with those given in Table I (Example 1) it will be seen that thorough washing of the clay after the heat treatement gives a significant improvement in the final 5 poise viscosity concentration.

Example 3

In this example there was used a fine, paper coating quality kaolinitic clay, which had a particle size distribution such that 78% by weight consisted of particles smaller than 2 microns e.s.d. and 0.5% by weight of particles larger than 10 microns e.s.d. and which contained as impurity fine mica 400 g. of this kaolinitic clay were stirred for 2 hours in 2 litres of a 2 N aqueous solution of lithium chloride. The lithium ion-saturated kaolinitic clay was then filtered and heated for 16 hours at a maximum temperature of 250° C.

The resulting hard cake of heated, lithium ion-saturated kaolinitic clay was then pulverised in a laboratory hammer mill and the pulverised clay was thoroughly washed with water, to remove the lithium cations as completely as possible, by three times performing the steps of slurrying the clay with clean water and then separating the washed clay from the water by filtration. The solids content of the fully deflocculated aqueous suspension of clay which had a viscosity of 5 poise at 22° C. was then determined as described above. The particle size distribution of the treated and hammer mill clay was also determined. The results obtained from the above experiment are shown in Table III below.

TABLE III

| Material | Solids in a suspension having a viscosity of 5 poise at 22° C. | Percent by weight of— Particles smaller than 2 microns e.s.d. | Particles larger than 10 microns e.s.d. |
|---|---|---|---|
| (K) Original raw kaolinitic clay | 70.3 | 78 | 0.5 |
| (L) Original raw kaolinitic clay, treated by the method of the invention and hammer milled | 74.1 | 77 | 0.3 |

This example shows that even when the kaolinitic clay initially has good rheological properties it is still possible to obtain an improvement using the method of the invention.

Example 4

In this example there was employed a raw kaolinitic clay having a particle size distribution such that 32% by weight consisted of particles larger than 10 microns e.s.d. and 42% by weight of particles smaller than 2 microns e.s.d. and having very poor rheological properties. 100 gm. samples of this clay were each suspended in 1 litre of an aqueous solution of lithium chloride, the concentration of lithium chloride in the solution being different for each sample of clay. In each case the suspension was stirred for 1 hour, after which the kaolinitic clay, now saturated with lithium ions, was filtered and then heated for 7 hours at a maximum temperature of 250° C. The resulting hard cake of heated, lithium ion saturated kaolinitic clay was pulverised in a laboratory hammer mill and the pulverised clay was thoroughly washed with water, to remove the lithium cations as completely as possible, as described in Example 3 above. The solids content of a fully deflocculated aqueous suspension of the clay which had a viscosity of 5 poise at 22° C. was determined. The results obtained in the above experiment are shown in Table IV below:

TABLE IV

| Concentration of LiCl in soln. (milliequivalents per 100 gm. of clay) | Percent by weight of solids in a deflocculated suspension having a viscosity of 5 poises at 22° C. |
|---|---|
| 50 | 55.0 |
| 100 | 62.8 |
| 250 | 64.5 |
| 500 | 64.7 |
| 1000 | 65.0 |
| 2000 | 64.9 |

The original, untreated kaolinitic clay had a viscosity of 5 poise at 22° C. in a fully deflocculated aqueous suspension with a solids content of 37.9%.

Example 5

100 gm. samples of a kaolinitic clay, which was suitable for ceramic purposes and which had a particle size distribution such that 13% by weight consisted of particles larger than 10 microns, e.s.d. and 46% by weight of particles smaller than 2 microns e.s.d., were each suspended in 1 litre of an aqueous solution containing 2000 milliequivalents of lithium chloride and a quantity of magnesium nitrate which was different for each sample. Each suspension thus obtained was stirred for 1 hour, after which the kaolinitic clay, now saturated with lithium ions, was filtered and then heated for 7 hours at a maximum temperature of 250° C. The resulting hard cake of heated, lithium ion-saturated kaolinitic clay was then pulverised in a laboratory hammer mill and the pulverised clay was thoroughly washed with water to remove the cations as completely as possible. The percentage reflectance to light of 458 and 574 millimicrons wavelength was determined, and the solids content of a fully deflocculated aqueous suspension of the clay which had a viscosity of 5 poise at 22° C. was measured.

As a comparison a further 100 gm. sample of the same kaolinitic clay was suspended in 1 litre of water containing no dissolved salts, stirred for 1 hour and then filtered and heated as described above. The percentage reflectance and 5 poise viscosity concentration at 22° C. were determined.

As a further comparison a sample of the original kaolinitic clay was chemically bleached in aqueous suspension with sodium dithionite which was present in a concentration equivalent to 4 lb. of dithionite per long ton of dry clay. The percentage reflectance and 5 poise viscosity concentration at 22° C. of the chemically bleached clay were determined.

The results obtained in the above experiments are shown in Table V below.

TABLE V

| Material | Concentration of Mg(NO$_3$)$_2$ in suspension (milliequivalents per 100 gm. of clay) | Percent by weight of solids in a suspension having a viscosity of 5 poise at 22° C. | Percent reflectance to light having a wavelength of— | |
|---|---|---|---|---|
| | | | 458 m$\mu$ | 574 m$\mu$ |
| (M) Original kaolinitic clay | 0 | 60.2 | 84.0 | 89.8 |
| (N) Chemically-bleached kaolinitic clay | 0 | 60.2 | 86.4 | 88.8 |
| (O) Heated without Li$^+$ ions | 0 | 62.8 | 77.8 | 84.0 |
| (P) Heated with Li$^+$ ions | 0 | 67.9 | 76.0 | 80.9 |
| (Q) Heated with Li$^+$ ions | 300 | 70.2 | 84.6 | 89.6 |
| (R) Heated with Li$^+$ ions | 600 | 71.2 | 85.7 | 90.1 |
| (S) Heated with Li$^+$ ions | 1,200 | 71.9 | 86.3 | 90.2 |

I claim:

1. A method of treating a raw kaolinitic clay in order to improve the rheological properties thereof, which method comprises the steps of (a) saturating or substantially saturating the raw kaolinitic clay with cations selected from the group consisting of lithium ions, magnesium ions and sodium ions, (b) washing the clay with an aqueous washing medium after it has been saturated or substantially saturated with said cations and (c) heating the thus treated clay to a temperature in the range of from 200° C. to 450° C.

2. A method according to claim 1, wherein the raw kaolinitic clay is saturated or substantially saturated with lithium ions and is thereafter heated to a temperature in the range 200° C. to 350° C.

3. A method according to claim 1, wherein the raw kaolinitic clay is saturated or substantially saturated with magnesium ions and is thereafter heated to a temperature in the range 300° C. to 400° C.

4. A method according to claim 1, wherein the raw kaolinitic clay is saturated or substantially saturated with sodium ions and is thereafter heated to a temperature in the range 400° C. to 450° C.

5. A method according to claim 1, wherein said clay is washed with water.

6. A method according to claim 1, wherein the heating of said kaolinitic clay is effected in the presence of a quantity of oxygen sufficient to oxidise organic compounds present in said clay.

7. A method of treating a raw kaolinitic clay in order to improve the rheological properties thereof, which method comprises the steps of (a) suspending the kaolinitic clay in an aqueous solution of an electrolyte containing a cation selected from the group consisting of lithium ions, magnesium ions and sodium ions, the solution containing at least 100 milliequivalents of the cation per 100 grams of the kaolinitic clay, whereby said kaolinitic clay is saturated or substantially saturated with said cations, (b) heating the thus treated kaolinitic clay to a temperature in the range 200° C. to 450° C. (c) comminuting the heated clay, and (d) washing the comminuted clay with an aqueous washing medium until the kaolinitic clay is free or substantially free from excess cations.

8. A method according to claim 7, wherein before the kaolinitic clay is heated to a temperature in the range 200° C. to 450° C. it is admixed with a compound which decomposes with the evolution of oxygen at a temperature which is from 50° C. to 150° C. higher than the temperature at which the clay is to be heated.

9. A method of treating a raw kaolinitic clay in order to improve the rheological properties thereof, which method comprises the steps of (a) saturating or substantially saturating the raw kaolinitic clay with cations selected from the group consisting of lithium ions, magnesium ions and sodium ions, (b) heating the thus treated clay to a temperature in the range of from 200° C. to 450° C., (c) comminuting the heated clay, and (d) washing the comminuted clay with an aqueous washing medium.

10. A method according to claim 9, wherein said comminuted clay is washed with water.

11. A method according to claim 9, wherein the heating of said kaolinitic clay is effected in the presence of a quantity of oxygen sufficient to oxidise organic compounds present in said clay.

12. A method according to claim 9, wherein the heating of said kaolinitic clay is effected in the presence of a compound which decomposes with the evolution of oxygen at a temperature which is from 50° C. to 150° C. higher than the temperature at which said clay is heated.

13. A method according to claim 9, wherein the raw kaolinitic clay is saturated or substantially saturated with lithium ions and is heated to a temperature in the range of from 200° C. to 350° C.

14. A method according to claim 9, wherein the raw kaolinitic clay is saturated or substantially saturated with magnesium ions and is heated to a temperature in the range of from 300° C. to 400° C.

15. A method according to claim 9, wherein the raw kaolinitic clay is saturated or substantially saturated with sodium ions and is heated to a temperature in the range of from 400° C. to 450° C.

References Cited

UNITED STATES PATENTS 2,000,338    5/1935    Kliefoth _____ 106—72

JAMES E. POER, Primary Examiner

U.S. Cl. X.R.

23—110 R; 106—73, 288 B